United States Patent
Rorden et al.

[11] 3,894,230
[45] July 8, 1975

[54] APPARATUS FOR DETECTING THE POSITION OF A MOVING OR MODULATED LIGHT BEAM

[75] Inventors: Robert J. Rorden, Santa Clara; Gerald Hunter Williams, Sunnyvale, both of Calif.

[73] Assignee: Coherent Radiation, Palo Alto, Calif.

[22] Filed: Oct. 25, 1973

[21] Appl. No.: 409,565

[52] U.S. Cl. ............... 250/203 R; 250/209; 356/172
[51] Int. Cl. ............................................. G01j 1/20
[58] Field of Search ...... 356/172, 153, 154; 33/281, 33/282, 285; 250/203, 209, 230, 231, 561

[56] References Cited
UNITED STATES PATENTS

| | | | |
|---|---|---|---|
| 3,469,919 | 9/1969 | Zellner | 33/281 |
| 3,588,249 | 6/1971 | Studebaker | 356/172 |
| 3,588,255 | 6/1971 | Alexander | 356/153 |
| 3,640,628 | 2/1972 | Jones | 250/203 |
| 3,649,122 | 3/1972 | Holtz | 356/4 |
| 3,709,609 | 1/1973 | Spengler | 250/230 |
| 3,742,233 | 6/1973 | Gorgens | 250/231 R |
| 3,775,741 | 11/1973 | Zechnowitz | 250/203 |

*Primary Examiner*—James W. Lawrence
*Assistant Examiner*—D. C. Nelms
*Attorney, Agent, or Firm*—Limbach, Limbach & Sutton

[57] ABSTRACT

An aligned array of photo-detecting devices, where each photo-detecting device corresponds to an increment in position, senses a pulsed light beam or a moving light beam which defines a reference plane. The output from an activated photo-detecting device is coupled to a numerical read-out display which provides a numerical read-out of the position of the moving beam.

10 Claims, 9 Drawing Figures

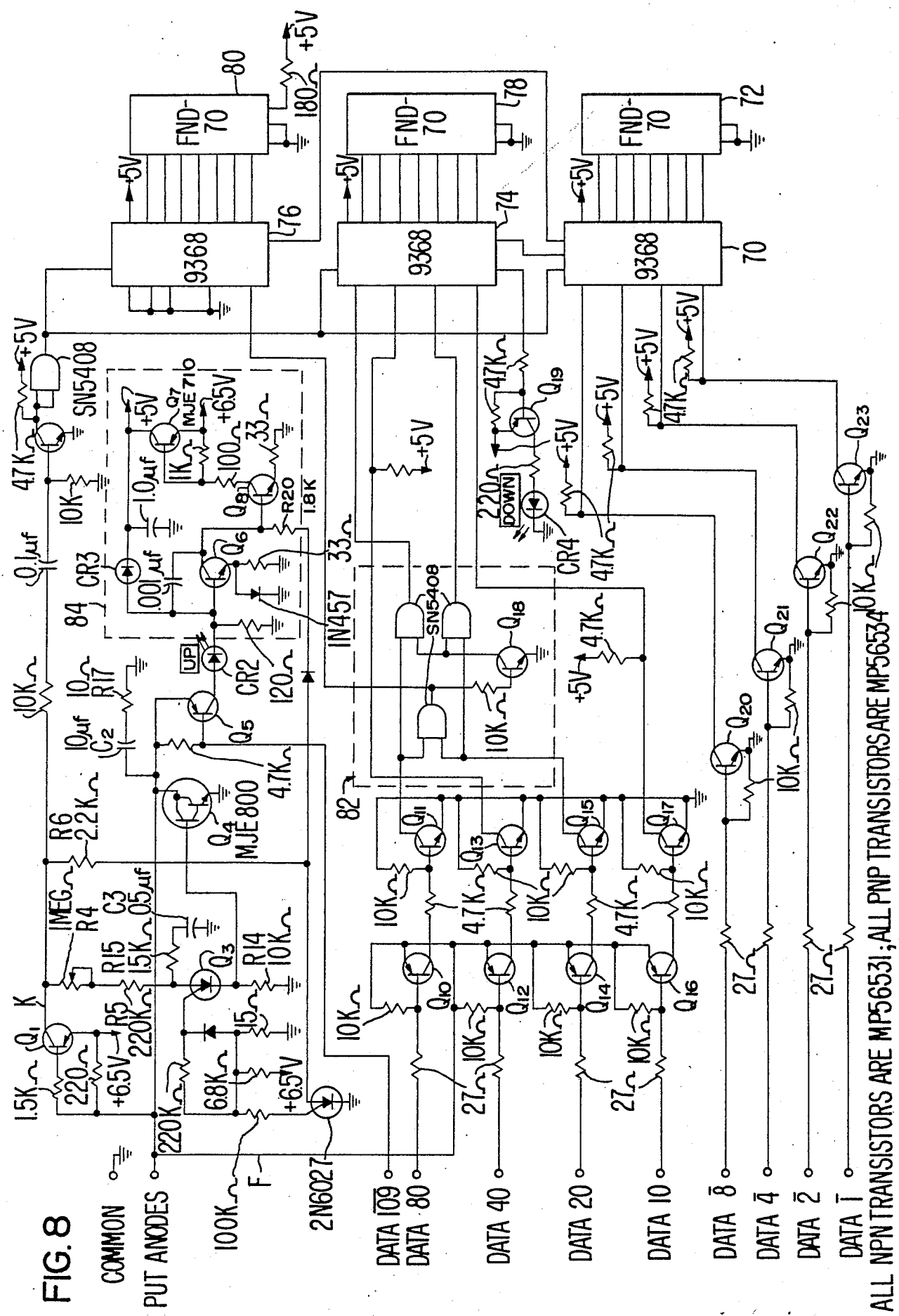

APPARATUS FOR DETECTING THE POSITION OF A MOVING OR MODULATED LIGHT BEAM

BACKGROUND OF THE INVENTION

The present invention relates to laser construction apparatus, and more particularly to improved means for detecting the position of a moving beam of light. Apparatus using lasers have rapidly come to replace traditional surveying equipment. For example, laser apparatus have been used to provide a visual reference line or plane for such applications as pipelaying, building construction, earthmoving and other construction applications.

One type of laser line reference system, which is used to replace the conventional transit dumpy level, uses a rotating laser beam as a reference plane. This is done either by rotating the laser itself, or more desirably, stationarily mounting a laser and providing a rotating mirror or prism system for deflecting the laser beam and rotating it to define the reference plane. Knowing the height of the reference beam instrument (H.I.) above the ground, it is apparent that the rotating reference beam can then be used to determine the elevation of points distant from the laser source.

Several devices are presently on the market for detecting the rotating beam at a remote location. While there are variations from product to product, they operate in the same general way. A photosensitive sensor or detector is slidably mounted on a graduated measuring or grade pole. The grade pole is held vertically at the remote point from the rotating laser source. The surveyor moves the slidable detector up and down until a null reading is indicated by the detector. The height of the pole is then read by the surveyor.

In one product, the detector has an electrical meter with a needle which comes into a null position when the detector is properly aligned. In another system, an audio signal indicates that the detector has been moved to the correct position so that the grade rod should be read. In another system, a series of lights are provided wherein one color light indicates that the detector is too high, another indicates that the detector is too low, and a third light indicates that the detector is properly positioned. In yet another system, a signal is sent back from the detector to terminate the laser light when the detector is in the correct position.

Unfortunately, such prior art null detection systems have several important deficiencies. First, they require that the human surveyor read out the height on the grade pole. This subjects the final reading to human error, as well as human interpretation which can vary from person to person depending upon his size, eyesight, lighting conditions, etc.

A second disadvantage is that the detector must be constantly moved up and down the grade pole for alignment with the rotating laser beam. This means that the grade pole and detector are constantly disturbed and so that just by movement of the detector alone, it is possible to introduce inaccuracies in the final read-out value.

SUMMARY OF THE INVENTION

It is therefore an object of the present invention to provide improved apparatus for detecting a rotating beam of light.

Another object of the invention is to provide an improved surveying device for accurately measuring the position of a rotating laser beam.

Another object of the invention is to provide a surveying instrument for measuring the position of a rotating laser beam relative to a reference plane which is less susceptible to human and other errors than prior art measuring apparatus.

In accordance with the present invention, a graduated measuring or grade pole is provided with a detector head which comprises a linear array of photo-detecting devices which is oriented in a direction perpendicular to the reference plane defined by the rotating laser beam. In the case of land surveying, therefore, the graduating measuring pole and detector are arranged vertically.

The photo-detecting devices are physically spaced in increments corresponding to the smallest units of linear distance to be measured. The output from the photo-detecting array is coupled with a numerical read-out display which can conveniently be carried separate and apart from the grade pole/detector by the operator of the equipment. When a photo-detecting device is activated by the sweeping laser beam, a numerical read-out is provided visually to the operator of the position of the laser beam.

In one embodiment the actual height of the laser beam is determined by summing the read-out display value, which corresponds to the distance between the activated photo-detecting cell and the bottom or lowermost portion of the photo-detecting devices, plus the height of the graduated measuring pole to the point of the lowermost photo-detecting cell. Of course, if desired or required, the graduated measuring pole can be eliminated and one single linear array of photo-detector devices can be used so that the read-out which is displayed represents the actual position of the rotating laser beam.

As the grade pole/detector is moved farther from the laser source, the diameter of the laser beam increases until it typically is greater in diameter than one or more of the photo-detecting devices. Assuming that the cross-sectional geometry of the laser beam is circular or nearly circular, where the photo-detecting devices are aligned transversely to the reference plane defined by the rotating laser beam, the first photo-detecting device which is intersected by the beam will be aligned with the center of the beam. In other words, the first photo-cell which is intersected by any part of the light beam will be the photo-cell which is in line with the center of the laser beam. Hence, the apparatus of the present invention is designed to indicate which photo-detection device first receives a light signal above a predetermined level and no other.

The read-out device latches to maintain the visual, numerical indication for a suitable display interval, preferably slightly less than the period of rotation of the rotating beam. The latching device is triggered into the conducting state, in accordance with another aspect of the present invention, by a current pulse from the corresponding photo-detector and in a manner so that no more than one latching device can be triggered at one time.

The present invention is applicable to the measurement of linear distances relative to a reference plane defined by a rotating beam of light oriented in any direction. Thus, while the subject invention is particularly applicable for measuring vertical heights relative to a horizontal plane, the present invention is equally applicable, for example, for measuring linear distances relative to a vertical reference plane. Of course, in the latter situation, the laser output is oriented so that the rotating beam is in a vertical plane and the sensor apparatus is positioned transverse to the vertical plane, i.e. in a horizontal line.

With the direct, numerical read-out, several of the possible sources of error inherent in the prior art "null-type" detectors are eliminated. Since the laser beam is detected and electronically converted into a numerical output display, there can be no possibility of human error in gauging the actual position of the laser beam. Additionally, once any part of the linear array of photo-detecting devices is in the path of the laser beam, no further movement of the detector relative to the graduated grade pole is required and hence unnecessary movement and disturbances are alleviated.

The present invention is also applicable to detect a pulsed or modulated beam of light. In this situation, instead of detecting a rotating beam which periodically intersects the detector, the laser beam is stationarily mounted to provide a uni-directional, but periodically interrupted beam of light.

It has been found that with the present invention, the distance from the laser source wherein accuracy to one one-hundredth of a foot can be maintained has been increased in some cases to over 50 percent of that possible with prior art devices.

BRIEF DESCRIPTION OF THE DRAWINGS

FIG. 8 is a schematic illustration of the display readout device of FIG. 2.

DESCRIPTION OF THE PREFERRED EMBODIMENTS

Figure 1:
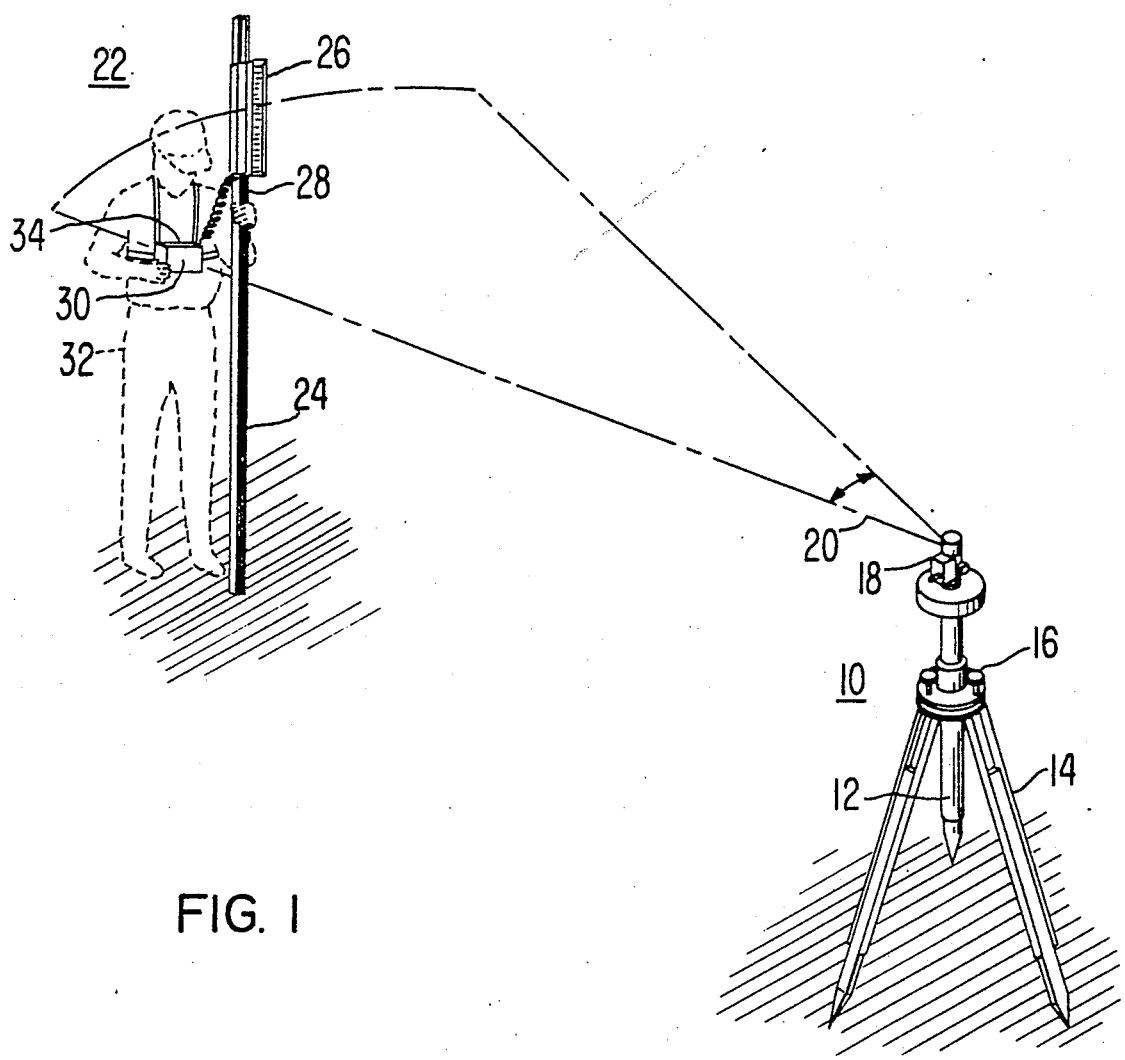
FIG. 1 is a figurative illustration of a position measuring system including a rotating laser beam and apparatus for measuring the position of the rotating laser beam in accordance with the present invention.

In FIG. 1 surveying apparatus is shown which includes a rotating laser beam source 10 for providing a reference plane. Laser beam source 10 includes an enclosed vertically supported laser 12 which is supported by a tripod 14. Suitable leveling gauges and adjustments 16 are provided to insure that the output from laser 12 is perfectly vertical. Situated above the output of the laser 12 is a motor speed control 18 which rotates a prism (not shown) which bends the vertical output beam from laser 12 to a horizontal position and, since it is rotated by the motor 18, rotates the laser beam 20 to define a reference plane, in this case a horizontal reference plane. Apparatus for projecting the rotating laser beam 10 are well known to those skilled in the art. One example of such an apparatus is described in U.S. Pat. No. 3,471,234 to R. H. Studebaker.

Located remotely from the rotating laser source 10 is laser beam measuring apparatus 22 comprising a graduated measuring or grade pole 24 and a sensor or detector head 26 which is slidably mounted to the grade pole 24. Coupled to the detector head 26 by umbilicus 28 is a digital numerical read-out device 30 which is suitably supported by a human surveyor 32. In accordance with the present invention, as the rotating laser beam 20 sweeps across the sensor 26, a visual numerical read-out is provided to the surveyor 32 on the display face 34 of the read-out device 30.

Figure 2:
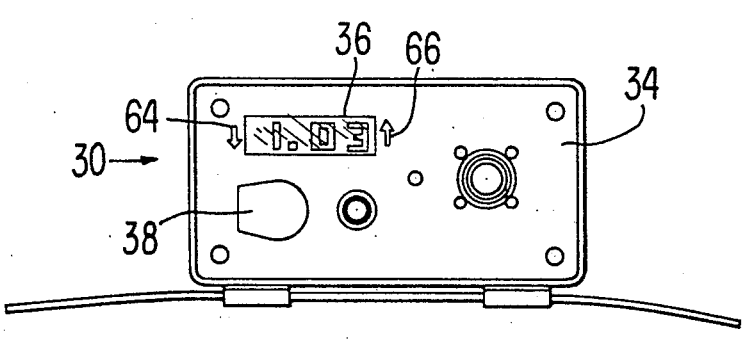
FIG. 2 is a top view of a numerical display for indicating numerically the position of the rotating beam of FIG. 1.

The read-out display face 34 is shown in greater detail in FIG. 2. The numerical value indicated on the numerical display 36 represents the distance between the intersection of the beam 20 to the bottom of a linear array of photo-detecting devices 40 in the detector head 26. Conveniently, suitable means such as a detent are provided so that the detector head 26 can be positioned at 1 foot intervals along the grade pole 24. In this way, the actual height of the beam where it intersects the detector head 26 is equal to the sum of the display shown at 36 with the height of the grade pole to the bottom of the array of photo-detecting devices 40 of the detector head 26.

The numerical read-out display device 30 also houses batteries which provide the power supply for the read-out as well as for the detector head.

Figure 3:
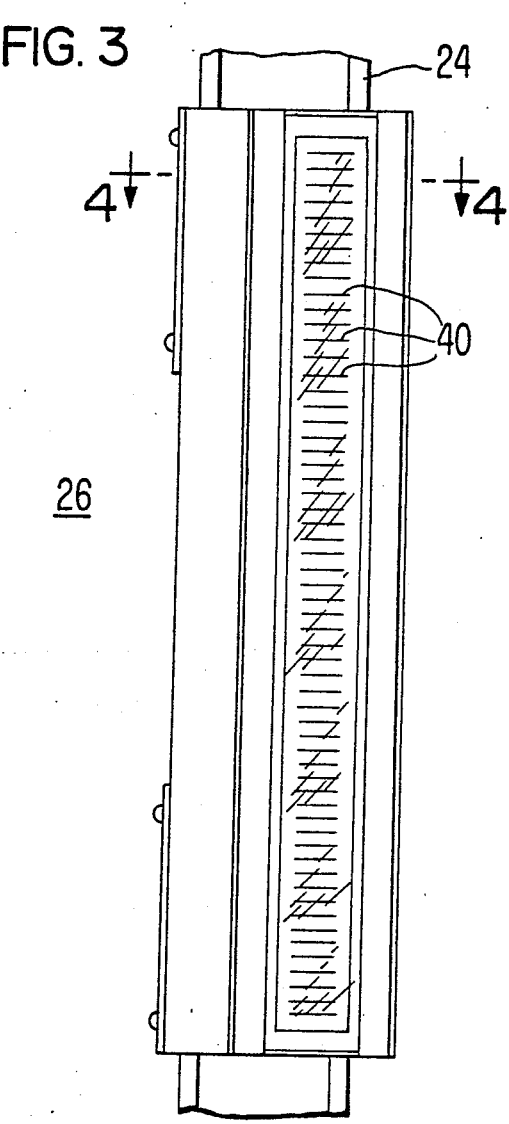
FIG. 3 is a plan view of the detector head of the beam measuring apparatus of FIG. 1.
Figure 4:
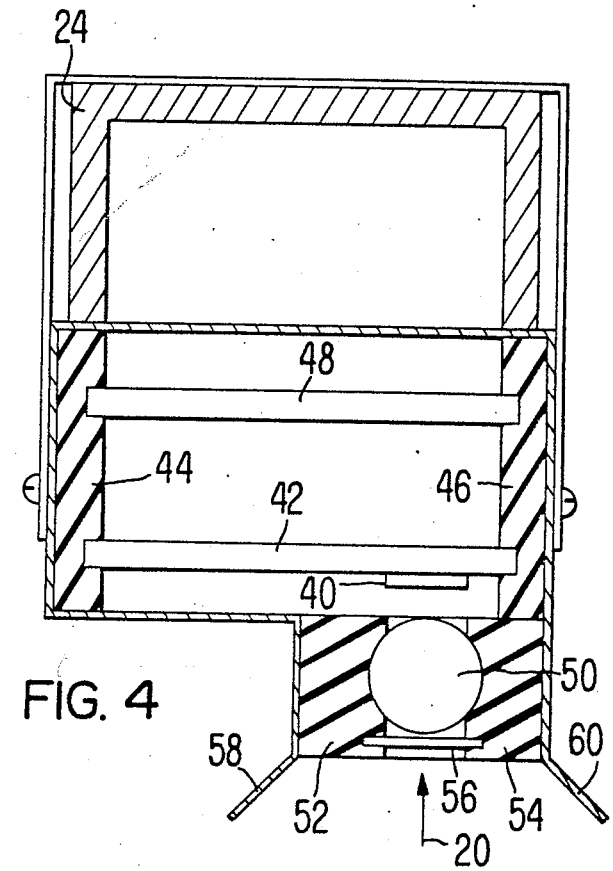
FIG. 4 is a cross-sectional view of the detector head of FIG. 3 taken in the direction indicated by the arrows in FIG. 3.

FIGS. 3 and 4 show in greater detail the sensor or detector head 26. Sensor 26 is provided with the linear array of photo-detecting devices 40. The photo-detecting devices 40 are physically spaced in increments of linear distance. For example, if it is desired that the smallest unit of measurement be 0.01 feet, each of the photo-detecting devices 40 centerpoints are spaced 0.01 feet apart. Consequently, the number and spacing of the photo-detecting devices 40 determine the resolution of the device. In one actual embodiment, 110 photo-detecting devices 40 are employed and spaced 0.01 inches apart. Thus, the total measuring distance of the detector head is 1.10 feet.

The linear array of photo-detecting devices 40 and other associated electrical circuitry is mounted on a printed circuit board 42 which is supported by spaced-apart rubber mounts 44 and 46. Other electrical components of the detector head 26 are supported on a second printed circuit board 48.

Since, particularly at remote distances from the laser source, the time interval in which the beam intersects the vertical array 40 of photo-detecting devices is extremely short, a plexiglass rod 50 is aligned with the array 40 and is supported by a pair of rubber mounts 52 and 54 to the sensor housing. The plexiglass rod 50 is used as a lens to increase the amount of light falling on the photo-detecting array.

Also supported by the rubber mounts 52 and 54 is a filter 56. The purpose of this filter is to reduce ultraviolet, bright sunlight, or other sources of light. It is designed to have a peak transmission at the wavelength of the laser source. For example, if a helium-neon laser is used with an output of 6328A, the filter is designed to have a peak transmission at this wavelength. The detector housing is flared at 58 and 60 to further block unwanted light from other light sources.

Figure 6:
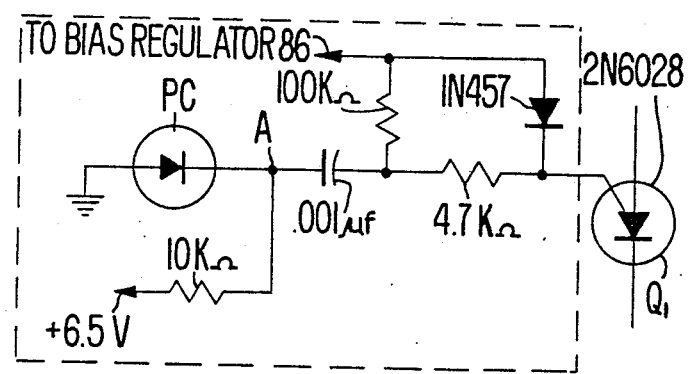
FIG. 6 is a schematic illustration of the gate circuit for each of the latching devices of FIG. 5.
Figure 7:
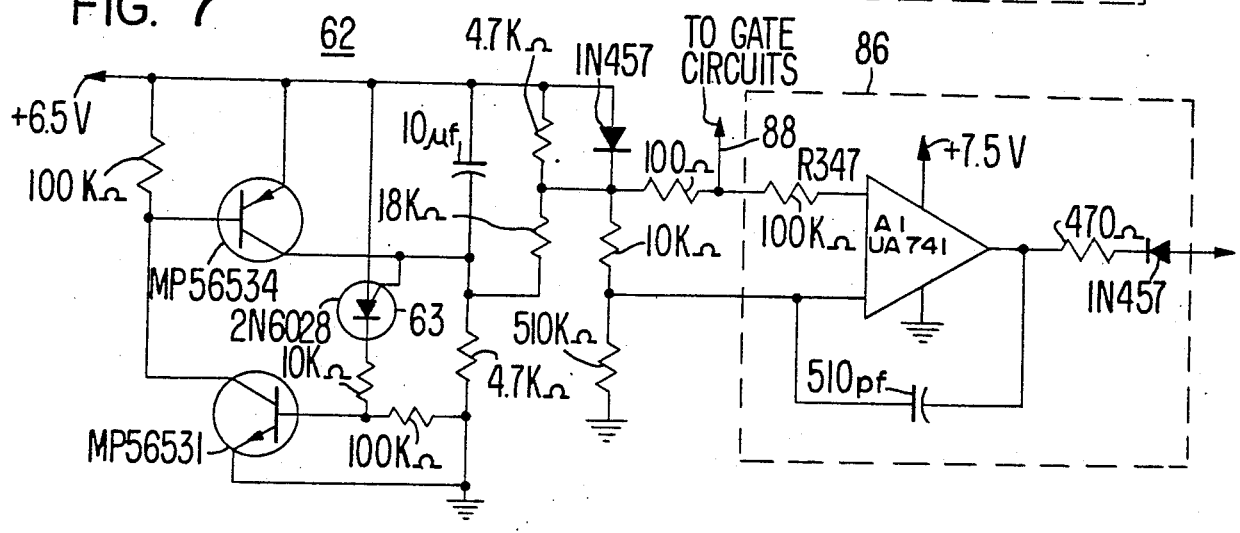
FIG. 7 is a schematic illustration of a voltage regulator circuit for the circuit of FIG. 5.

FIGS. 5 to 7 illustrate schematically the electrical circuits in one actual embodiment of the detector head 26 of FIG. 3. For each photocell 40 in the detector head 26 there is a latching device Q1–Q110 (FIG. 5). In the embodiment illustrated, each of the latching devices comprises a programmable unijunction transistor (PUT). Whenever one of the photocells 40 is activated by the rotating laser beam 20, the corresponding latching device Q1–Q110 is energized which, as will be explained, results in the position of the beam 20 being displayed to the operator on the read-out device 26 shown in FIG. 2. As will be explained, each of the latching devices Q1–Q110 is connected in a circuit which allows only one to be conducting at a time. The first photocell 40 to be exposed to a light pulse above a triggering level activates the corresponding PUT.

FIG. 6 illustrates the gate circuit for each of the PUT latching devices Q1–Q110. Since each such circuit is identical, for purposes of clarity, only one circuit is shown and described. The threshold voltage for the particular PUT illustrated in this circuit, a 2N6028, is 0.6 volts. The gate circuit is designed so that in the absence of a light impulse striking the photocell PC, the gate electrode of Q1 is maintained at about 0.4 volts below the anode voltage. This is about 0.2 volts below the threshold voltage and hence Q1 remains deactivated.

The anode of Q1 is connected to the portable batteries which form a part of the read-out device 30 carried by the user. A bias regulator circuit 62, shown in FIG. 7, is used to provide a temperature dependent voltage to the gate circuit to insure that the gate electrode of Q1 is always maintained at below the threshold voltage of Q1. A PUT device 63 identical to those used for Q1–Q110 is used as the reference device in the regulator circuit 62. This compensates for the variation of the PUT threshold voltage with temperature.

Referring again to FIG. 6, if the normally nonconducting photocell PC1 is struck by the beam of light, it begins to conduct and the voltage at node A drops. This voltage drop is coupled through capacitor C1 to the gate electrode of Q1. When the voltage of the gate electrode drops below the 0.6 volt threshold of Q1, then Q1 begins to conduct and, as explained, an appropriate read-out is displayed by the read-out device 30 of FIG. 2. As will be explained subsequently, only one PUT is permitted to be activated at one time.

Figure 5A:
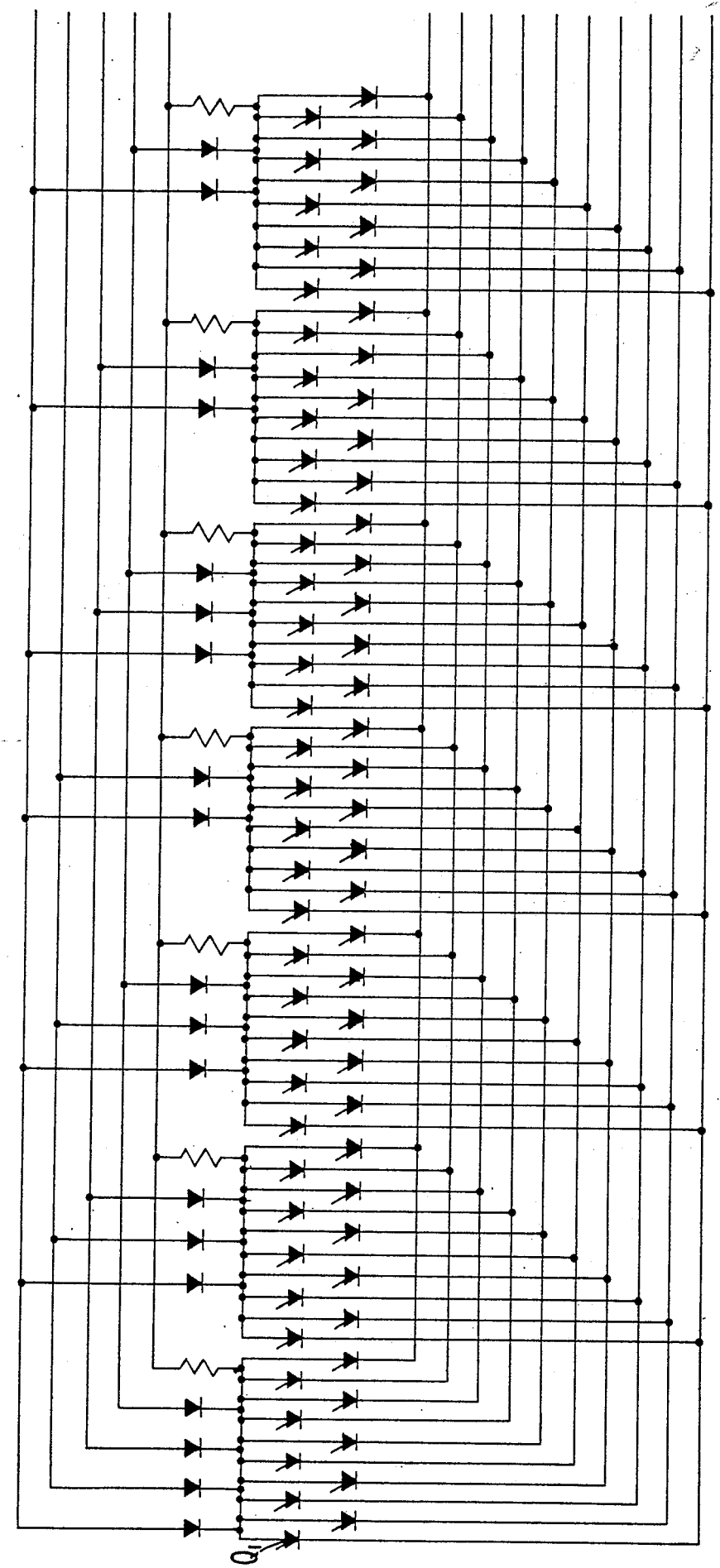
FIGS. 5A and 5B are schematic circuit diagrams of the photo-detecting array and latching devices of the detector head of FIG. 3.
Figure 5B:
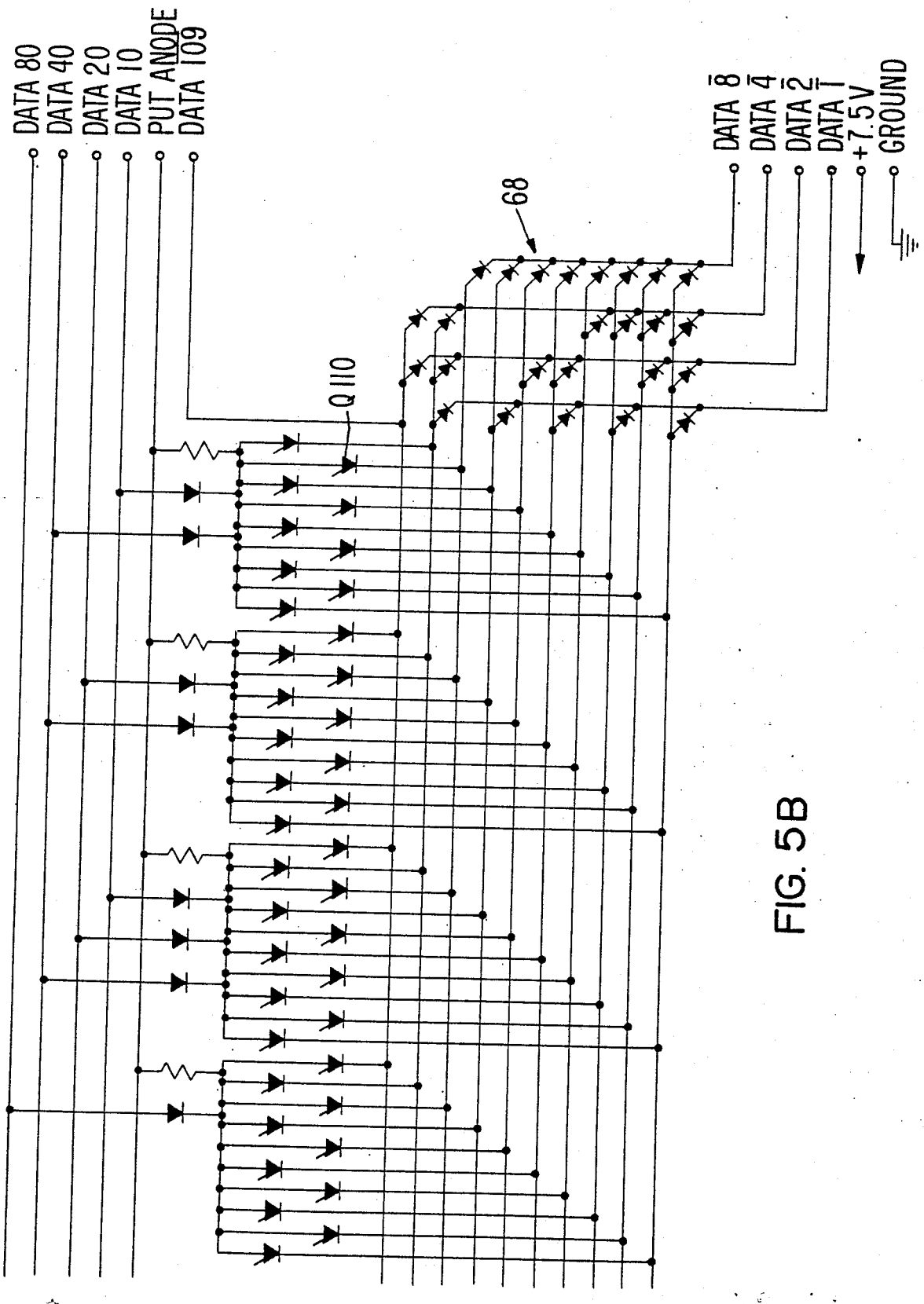

Referring to FIGS. 5A and 5B, the latching device Q1, which is the farthest to the left in FIG. 5A, is associated with the latching device for the photocell which is the lowest on the vertical array of FIG. 3. Similarly, latching device Q110, the farthest to the right in FIG. 5B, is associated with the top photocell of the array of FIG. 3. As will be explained in greater detail, whenever Q1 is energized, the "down" arrow 64 of the display device of FIG. 2 is illuminated indicating to the user that the sensor head 26 should be lowered by a foot. Similarly, if the top photocell is energized and Q110 is turned on, the "up" arrow 66 is lit indicating that the user should move the sensor head upward one foot. The state of the output line entitled "Data 109" changes in the latter situation.

The 110 latching devices Q1–Q110 are arranged in blocks of 10. In the present embodiment, whithin each block each succeeding latching device to the right corresponds to the incremental vertical increase of position of 0.01 feet of each of the photo-detecting devices. Common digits in each block are connected together as shwon and the 10 decimal lines are provided to a BCD diode decoding matrix 68. The outputs of the decoding matrix are the DATA $\bar{1}$, DATA $\bar{2}$, DATA $\bar{4}$ and DATA $\bar{8}$ lines and provide the hundredths-of-a-foot binary value for each position value. Such matrices are well known to those skilled in the art and perform the function of converting the decimal digits into BCD coded numbers.

In the particular embodiment disclosed, the outputs from the diode decoding matrix 68 are provided in the form of complementary BCD coded signals. This is best illustrated by an example. If the PUT for a vertical position having the least significant digit of 6 (0.06 feet) is energized, then the BCD output for that digit would be binary 4 plus binary 2. However, in the embodiment illustrated, rather than providing an output for a binary 4 and a binary 2, an output is provided for a binary 1 and a binary 8 at the DATA $\bar{1}$ and DATA $\bar{8}$ outputs, respectively. That is, the two binary numbers 4 and 2 are left at zero and the binary numbers 8 and 1 are raised. Hence, the terminology of complementary BCD logic.

A similar complementary BCD logic is used in decoding the tenths of feet. The tenths of feet BCD coded numbers are provided at the DATA 10, DATA 20, DATA 40 and DATA 80 outputs. Thus, for example, if the height of the beam from the bottom of the detector head is 0.05 feet, an output is provided on all four of the DATA lines 10–80. If the number is 0.15, a signal is provided on the DATA 20, DATA 40 and DATA 80 lines, but not on the DATA 10 line.

In FIGS. 5A and 5B, in one actual embodiment, all of the diodes are IN457 and each of the PUT's, Q1–Q110, are 2N6028. FIG. 8 is a schematic diagram of the electronic circuitry of the numerical read-out display 30. The DATA output signals from the detector head circuitry (FIGS. 5A and 5B) are sent via the umbilical connection 28 to the read-out display 30 as depicted in FIG. 1.

A BCD signal for the least significant digit (0.01's feet) enters DATA $\bar{1}$, DATA $\bar{2}$, DATA $\bar{4}$ and DATA $\bar{8}$ input and they pass through four transistors Q23, Q22, Q21 and Q20, respectively. The outputs from these transistors are inverted and hence the signals which enter seven-segment decoder 70 are no longer complementary BCD. The decoder 70 decodes the BCD signals and drives a seven-segment output display 72 for the least significant digit, i.e. for the 0.01's feet unit. In the particular embodiment disclosed, the output display 72 is a seven-segment light emitting diode (LED) display. However, any suitable type of display, such as a liquid crystal display, could be used.

The tenth's of feet BCD signals enter through the DATA 10, DATA 20, DATA 40 and DATA 80 inputs and pass through four pairs of transistors, Q16–Q17, Q14–Q15, Q12–Q13 and Q10–Q11, respectively.

The outputs from these transistor pairs are used to drive a tenths-of-feet seven segment decoder 74 as well as a one-foot decoder 76. Decoder 74 drives a tenths-of-feet seven segment LED display 78 and the decoder 76 drives a 1 foot display 80. Logic circuitry 82 is provided to signal the 1-foot decoder 76 any time the rotating laser beam is above 0.99 feet.

The DATA 109 input, which provides a signal whenever the uppermost photocell in the array 40 is activated, is connected through transistor Q5 with light emitting diode CR2. Whenever the uppermost photocell is activated, the binary level of DATA 109 input goes low, Q5 is turned on and CR2 lights up arrow 66 on display 30 indicating to the user that the detector head should be moved up one foot.

When the bottommost photocell is energized, corresponding to the latching device Q1, the BCD input to the decoder 70 is all zeros and the decoder 70 is arranged to automatically blank the display, not only for the least significant digit display 72 but also for the tenths-of-feet 78 and 1.0 feet 76 display. Additionally, the decoder 70 energizes transistor Q19 via the tenths-of-feet decoder 74 to illuminate the light emitting diode CR4 to illuminate the down arrow 64 in the readout display 30.

The circuit is arranged so that only one latching device Q1–Q110 is allowed to conduct at any one time for the reasons explained previously. This is accomplished as follows. Any time any photo-detecting device is activated, one or more of the inputs to the transistor pairs Q10–Q11, Q12–Q13, Q14–Q15 and Q16–Q17 goes from a binary one level to a binary zero level. The emitters of each of these transistors are connected to a common line F. Consequently, if any one or more of these transistors is turned on, the voltage level of line F drops. Line F is connected to a line PUT ANODES which is common to all of the anodes of Q1–Q110, and as a result when F goes low, the anode voltages on each of the PUT's drops insuring that the threshold of the 109 PUT's which have not been activated are prevented from being activated at the same time as the one PUT which is activated.

It is desired that the output display remain on for a period of time close to but somewhat less than the interval between the times that the rotating beam strikes the detector 40. Thus, prior to the time when the rotating laser beam strikes the detector head, the single activated latch Q1–Q110 is deactivated, in the following manner.

As explained, whenever one of the photo diodes is activated, line F goes low. This turns on PNP transistor Q1 causing its collector voltage K to go high. Current then begins to flow through resistors R4, R5 and R15 and capacitor C3 charges. The anode of Q3, which is initially at zero volts, begins to rise towards the threshold value for Q3. The time it takes to reach the threshold voltage of Q3 is a function of the time constant given by the following relationship:

$$t_c = (R4 + R5 + R15) \times C_3$$

Once the threshold of Q3 is reached, Q3 conducts and the current through R14 causes the cathode voltage of Q3 to rise, which in turn renders Darlington transistor Q4 conducting. When this happens, line F is pulled to nearly zero volts and the single activated latching PUT is turned off. R4 is variable so that the time constant $t_c$ and hence the period of time the latching device is activated is made variable. This adjustment is made by the operator.

Line F remains at a low voltage for a period of time depending upon the values of capacitor C2 and resistor R17. After capacitor C2 charges, the voltage of line F rises to its normal state of approximately 6.5 volts. This, in turn, turns off transistor Q1 and line K drops in voltage.

Thus far, the operation of the timing system to reset the detector has only dealt with resetting the single activated latching device after a predetermined interval. The other function of the timing system is to activate and deactivate the display which will now be explained. In the embodiment of FIG. 8, a voltage regulator 84 including transistors Q6, Q7, Q8 and zener diode CR3 provide a regulated 5 volt output to drive the decoders 70, 74 and 76 and the LED displays 72, 78 and 80.

When none of the photocells have been activated and Q1 in FIG. 8 is non-conducting, the collector K of Q1 is low as explained. The base of transistor Q8 is connected with K to resistors R6 and R20. When K is low, Q8 is off and insufficient base current passes through Q7 for Q7 to be turned on. As a result, the output of regulator 84, the collector terminal of Q7, is zero volts and the displays are off.

But when Q1 turns on and K goes high, Q8 turns on and a current passage is provided for the gate current of Q7 through Q8. As a result, a 5 volt regulated output is provided from the collector of Q7. Once the Darlington transistor Q4 turns on and line F goes to zero and Q1 turns off, line K goes low again turning off transistor Q8 and deactivating the LED and logic power regulator.

Referring to FIGS. 5–7, a single bias regulator 62 is provided for all 100 latching devices, Q1–Q110. As explained previously, the circuit has been arranged in a manner to prevent the simultaneous triggering of more than one latching device at a time. As further protection, a protection disable circuit 86 is provided to positively insure that no numerical display is made if more than one PUT is activated. Protection circuit 86 is illustrated in FIG. 7 and forms part of the bias regulator 62.

Line 88 of the bias regulator 62 is connected to each of the gate circuits of FIG. 6. The voltage across R349 is proportional to the total gate current through all the PUTs. If two PUTs trigger, then this voltage doubles. The operational amplifier A1 is biased so that it detects the increased voltage and the output thereof changes from a high to a low signal. This signal is then used to disable the display so that no ambiguity can occur.

What is claimed is:

1. Apparatus for detecting the position of a moving or modulated light beam relative to a reference plane comprising:
   a. a linearly aligned array of photo-detecting devices oriented perpendicularly to said reference plane, where said photo-detecting devices are positioned with respect to each other in increments corresponding to the units of position to be measured;
   b. a numerical read-out display;
   c. means responsive to the temporary energization of a photo-detecting device for providing a numerical read-out on said display of the position of the beam relative to said reference plane whenever one of said photo-detecting devices is energized thereby; and
   d. a latching device associated with and responsive to each photo-detecting device which links each photo-detecting device with said read-out providing means, said latching device maintaining a read-out on said display for a sufficiently long period of time for human observation.

2. Apparatus for measuring the vertical height above the ground of a beam of light rotating in a horizontal plane, comprising:

a. a vertically oriented graduated measuring pole;
b. a light beam sensor head movably supported upon said graduated measuring pole;
c. said sensor head comprising a vertically oriented array of photo-detecting devices, where said photo-detecting devices are physically spaced in increments equal to the smallest units of vertical height to be measured;
d. a numerical read-out display;
e. means responsive to the temporary energization of a photo-detecting device by said rotating beam of light for providing a numerical read-out on said display of the vertical height above ground of the intersection of the rotating beam with said sensor head; and
f. a latching device associated with and responsive to each photo-detecting device which links each photo-detecting device with said read-out providing means, said latching device maintaining a read-out on said display for a sufficiently long period of time for human observation.

3. Apparatus as in claim 2 wherein said period of time is less than the period of rotation of said rotating beam.

4. Apparatus as in claim 2 including means for preventing more than one of said latching devices from being activated at one time.

5. Apparatus as in claim 2 including means for inhibiting said read-out providing means if more than one latching device is activated at one time.

6. Apparatus as in claim 2 wherein said read-out providing means displays a numerical read-out of the vertical height of the activated photo-detecting device relative to the bottom of said vertical array of photo-detecting devices, and wherein the measured height of said rotating beam comprises the sum of the numerical read-out value and the height of said graduated measuring pole to the bottom of said display.

7. Apparatus for measuring the linear distance from a reference point perpendicularly to a plane which is defined by a rotating beam of light comprising:
a. a graduated measuring pole oriented perpendicularly of said plane;
b. a light beam sensor head movably supported upon said graduated measuring pole;
c. said sensor head comprising a linear array of said photo-detecting devices, where said photo-detecting devices are physically spaced in increments equal to the smallest units of linear distance to be measured along said graduated measuring pole;
d. a numerical read-out display;
e. means responsive to the temporary energization of a photo-detecting device by said rotating beam of light for providing a numerical read-out on said display of the linear distance of the intersection of said light beam and sensor relative to said reference point; and
f. a latching device associated with and responsive to each photo-detecting device which links each photo-detecting device with said read-out providing means, said latching device maintaining a read-out on said display for a sufficiently long period of time for human observation.

8. Apparatus as in claim 7 including means for preventing more than one of said latching devices to be activated at one time.

9. Apparatus as in claim 7 including means for inhibiting said read-out providing means if more than one latching device is activated at one time.

10. Apparatus as in claim 7 wherein said read-out providing means displays a numerical read-out of the linear position of the activated photo-detecting device relative to one end of linear array of photo-detecting devices, and wherein the measured distance of said rotating beam relative to said reference point comprises the sum of the numerical read-out and the value of said graduated measuring pole at said one end of said linear array.

* * * * *